(12) United States Patent
Hench

(10) Patent No.: US 9,322,387 B2
(45) Date of Patent: Apr. 26, 2016

(54) MAXIMIZING OUTPUT OF A GENERATOR OPERATING UNDER THE INFLUENCE OF WAVE MOTION BY APPLYING AN OPTIMUM RESTORING FORCE

(71) Applicant: Neptune Wave Power LLC, Dallas, TX (US)

(72) Inventor: Steven C. Hench, Dallas, TX (US)

(73) Assignee: Neptune Wave Power LLC, Dallas, TX (US)

( * ) Notice: Subject to any disclaimer, the term of this patent is extended or adjusted under 35 U.S.C. 154(b) by 0 days.

(21) Appl. No.: 13/842,514

(22) Filed: Mar. 15, 2013

(65) Prior Publication Data

US 2014/0265340 A1 Sep. 18, 2014

(51) Int. Cl.
| | |
|---|---|
| *F03B 13/10* | (2006.01) |
| *F03B 13/12* | (2006.01) |
| *H02P 9/04* | (2006.01) |
| *F03B 13/20* | (2006.01) |

(52) U.S. Cl.
CPC .......... *F03B 13/20* (2013.01); *F05B 2240/917* (2013.01); *F05B 2270/20* (2013.01); *F05B 2270/30* (2013.01); *F05B 2270/32* (2013.01); *Y02E 10/38* (2013.01)

(58) Field of Classification Search
USPC .................................................. 290/42, 53
See application file for complete search history.

(56) References Cited

U.S. PATENT DOCUMENTS

| | | | | |
|---|---|---|---|---|
| 7,420,287 | B2 * | 9/2008 | Smushkovich | 290/42 |
| 7,429,127 | B2 * | 9/2008 | Walker et al. | 374/109 |
| 8,046,108 | B2 | 10/2011 | Hench | 700/286 |
| 8,157,205 | B2 * | 4/2012 | McWhirk | 244/30 |
| 8,866,328 | B1 * | 10/2014 | Hench et al. | 290/53 |
| 8,947,230 | B1 * | 2/2015 | Gettings et al. | 340/540 |
| 9,051,918 | B1 * | 6/2015 | Hench et al. | |
| 9,070,272 | B2 * | 6/2015 | Gettings et al. | |
| 2006/0050765 | A1 * | 3/2006 | Walker et al. | 374/109 |
| 2009/0152391 | A1 * | 6/2009 | McWhirk | 244/30 |
| 2009/0160191 | A1 * | 6/2009 | Beane | 290/53 |
| 2010/0123313 | A1 * | 5/2010 | Hobdy | 290/42 |
| 2014/0152015 | A1 * | 6/2014 | Sidenmark et al. | 290/53 |
| 2015/0020614 | A1 * | 1/2015 | Gettings et al. | 73/865.8 |
| 2015/0020615 | A1 * | 1/2015 | Gettings et al. | 73/865.8 |
| 2015/0021465 | A1 * | 1/2015 | Gettings et al. | 250/216 |
| 2015/0022337 | A1 * | 1/2015 | Gettings et al. | 340/501 |
| 2015/0022340 | A1 * | 1/2015 | Gettings et al. | 340/509 |
| 2015/0022351 | A1 * | 1/2015 | Gettings et al. | 340/540 |
| 2015/0022352 | A1 * | 1/2015 | Gettings et al. | 340/540 |
| 2015/0022356 | A1 * | 1/2015 | Gettings et al. | 340/568.1 |
| 2015/0022357 | A1 * | 1/2015 | Gettings et al. | 340/568.1 |
| 2015/0185161 | A1 * | 7/2015 | Gettings et al. | |

* cited by examiner

*Primary Examiner* — Pedro J Cuevas
(74) *Attorney, Agent, or Firm* — Norton Rose Fulbright US LLP

(57) ABSTRACT

A system and method for harnessing power associated with ocean waves and converting that power into electricity. The apparatus houses a vertically oriented central shaft, a pendulum, a generator, and other components that operate to optimize power output of the generator. Various operating parameters may be initially set and later changed to effectuate a restoring force applied to the apparatus against wave motion so that generator output is maximized. The optimum restoring force may vary according to changing environmental conditions. A library of environmental data and associated parameter values, tuning responses, and the like is stored at a central location or local to the apparatus.

32 Claims, 5 Drawing Sheets

MAXIMIZING OUTPUT OF A GENERATOR OPERATING UNDER THE INFLUENCE OF WAVE MOTION BY APPLYING AN OPTIMUM RESTORING FORCE

BACKGROUND

One source of alternative energy includes a generator operating under the influence of wave motion. Such a generator may comprise a pendulum enclosed in a buoyant housing that floats on the surface of the water. Waves cause the housing to tilt from the horizontal such that the pendulum rotates about its axis, thereby driving the generator.

Pendulum rotation must be maximized over time to maximize output of the generator. It has been found that pendulum rotation increases when its housing is forced to move, at least to some extent under certain conditions, against the prevailing wave motion. However, when the pendulum housing is allowed to float in the prevailing wave direction in unrestrained fashion, the pendulum housing naturally finds the point of lowest potential energy. As a result, pendulum rotation is not maximized. On the other hand, if the pendulum housing is overly constrained, pendulum rotation will not be maximized because the pendulum housing is forced to cut through the wave rather than tilt along the surface. Therefore, in order to maximize generator output the pendulum should be forced to sufficiently work against the wave while having the flexibility to exploit the full scope of the wave's motion.

DETAILED DESCRIPTION

According to the inventive concepts described herein, a generator converts energy associated with wave motion into electrical energy. In one implementation, the generator comprises a pendulum housed within a compartment that rotates under the influence of wave motion, i.e., as it tilts with respect to the horizon.

Figure 1A:
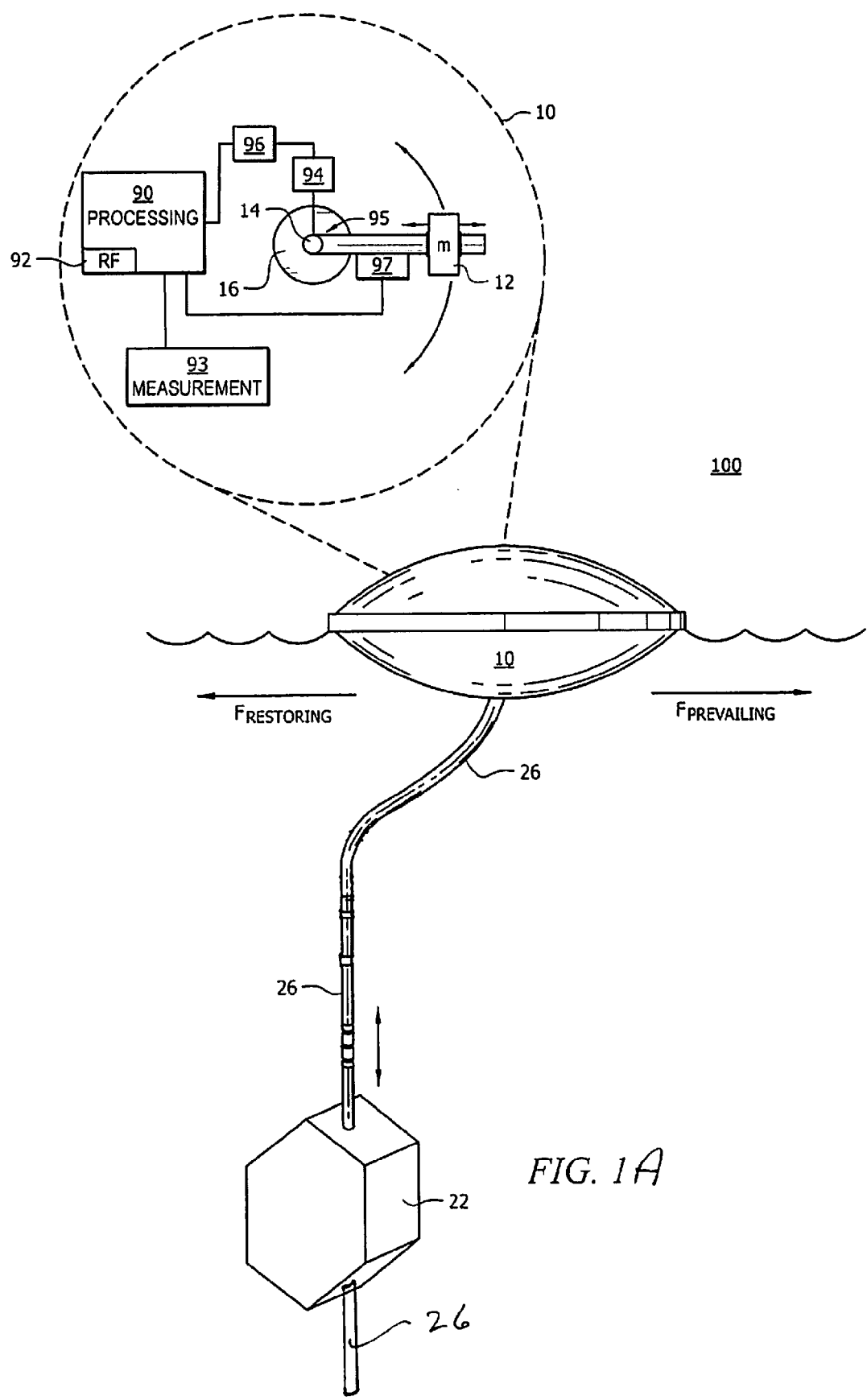
FIG. 1A is a system diagram according to a preferred embodiment.

FIG. 1A illustrates such a generator according to a preferred embodiment. Apparatus 10 is a buoy that houses components of an energy recovery mechanism, including a generator, that converts energy associated with ocean waves into electrical energy. Components within apparatus 10 comprise a pendulum 12 rotating about a vertically-oriented axis 14, as apparatus 10 tilts under the influence of wave motion. Rotating pendulum 12 drives generator mechanism 16. The generated energy can then be stored at apparatus 10 or transferred by, e.g., conductors, to a remote usage or storage facility and the like.

According to the illustrated embodiment, apparatus 10 forms an oblate sphere configured so that the curvature of the combined components allow apparatus 10 to move gracefully with, as opposed to "slapping" against, the waves. Pendulum 12 and other generator components are housed within apparatus 10. During operation, pendulum 12 rotates about central axis 14, which extends between central points of each shell component. As apparatus 10 moves under the influence of wave motion it tilts with respect to a horizontal plane. As such, pendulum 12 is accelerated by gravity and other x, y, z acceleration forces caused by the waves towards the point within apparatus 10 having the lowest potential energy. When accelerated in such fashion, pendulum 12 is constrained to rotate about axis 14 in a plane perpendicular to axis 14. As can be easily envisioned, the traveling rise and fall motion of the waves will cause apparatus 10 to tilt from side-to-side, thereby changing the point of lowest potential energy within apparatus 10. As this happens, pendulum 12 will be accelerated from one point within apparatus 10 to another, all the while rotating between those points.

The semi-random nature of wave motion is not conducive to allowing pendulum 12 to rotate in a constant direction, i.e., clockwise or counter-clockwise. As such, pendulum 12 rotates freely in the clockwise or counter-clockwise direction. Generator 16 is in mechanical communication with pendulum 12 and central axis 14 so that rotation of pendulum 12 and central axis 14 causes generator 16 to rotate. Preferably, generator 16 comprises a gear that is engaged with a gear located at axis 14. As axis 14, which may be a shaft, rotates, its gear drives the gear on generator 16. Other useful embodiments are envisioned where generator 16 is in communication with axis 14 by another means known in the art. For example, generator 16 and axis 14 may be in mechanical communication via a belt, chain or direct mechanism.

Generator 16 preferably has an axis of rotation in close proximity to the axis of rotation of axis 14. This arrangement allows the torque moment of generator 16 to be close to the torque moment of axis 14. As such, the total torque felt at apparatus 10 is substantially centralized. Overall, this improves the mechanical efficiency of apparatus 10, that is, such a configuration provides improved flexibility in dealing with torsional loads exerted upon apparatus 10 and other components, and allows various gearing ratios and power transmission alternatives to be explored.

Figure 1B:
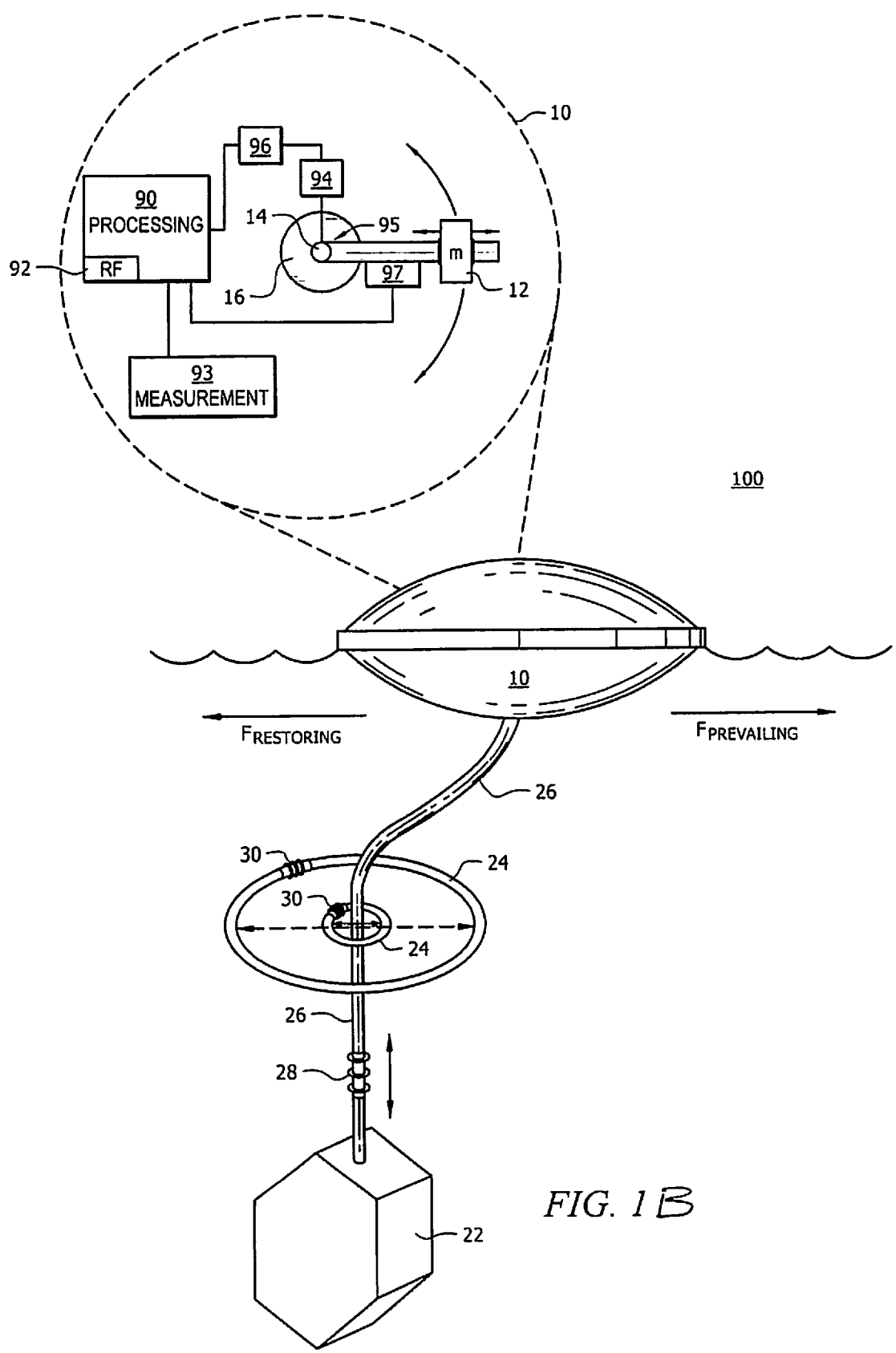
FIG. 1B is a system diagram according to another embodiment.

According to an alternative embodiment illustrated at FIG. 1B, mooring line 26 is shown extending between apparatus 10 and counterweight 22 through adjustable restraining ring 24. In the illustrated embodiment, mooring line 26 extends from a central point of apparatus 10, so that apparatus 10 remains balanced along the water surface. Mooring line 26 is configured with apparatus 10 to allow unconstrained rotation of the apparatus 10 without creating torsion on mooring line 26. Specifically, counterweight 22, attached along the bottom end of mooring line 26, allows apparatus 10 to move up and down along the wave surface according to wave motion. According to the embodiment, mooring line 26 freely moves within adjustable restraining ring 24, vertically and rotationally, and is constrained within adjustable restraining ring 24 by counterweight 22. Such an arrangement is thought to be particularly beneficial in that apparatus 10, and likewise mooring line 26, can rotate without twisting or breaking mooring line 26.

As described above, referring to the preferred embodiment illustrated at FIG. 1A, adjustable restraining ring 24 is not utilized in the system. Instead, a first portion of mooring line 26 extends between apparatus 10 and counterweight 22 and a second portion of mooring line 26 extends to between counterweight 22 and, e.g., an anchor, the seafloor, or the like. Counterweight 22 may be adjusted along the length of mooring line 26 to vary the restoring force applied to apparatus 10, as described herein. In that case, the adjustable position of counterweight 22 along the length of mooring line 26 may be set or changed to effectuate changes in mooring line angle, the degree of freedom of counterweight 22, and other variables according to various embodiments.

For each embodiment illustrated in FIGS. 1A and 1B, it should be appreciated that counterweight 22 plays an important role in increasing the power captured by apparatus 10. That is, counterweight 22 serves as a mechanism that works against the lateral forces exerted upon apparatus 10 by waves at the surface. Specifically, counterweight 22, by exerting downward force on apparatus 10 about a center point, resists lateral motion of apparatus 10. By acting to resist the lateral forces at or near the surface, counterweight 22 prompts apparatus 10 to work against the waves themselves, thereby improving system performance. Counterweight 22 also serves as a bottom-centered ballast and a means to pull apparatus 10 back into vertical alignment with adjustable restraining ring 24.

The pendulum assembly comprises pendulum 12 rotating about a central axis 14 as previously described. However, as will be discussed in greater detail below, the pendulum assembly further includes processing module 90, RF communication module 92, measurement module 93, load variation mechanism 94, brake 95, corresponding braking circuit 96, and length variation mechanism 97. The combination of these additional components serves to optimize apparatus 10, specifically, these component work together to maximize the power output of apparatus 10.

A pendulum's power output over time is maximized where the pendulum rotates in a resonant state. Ideally, the present invention would operate such that the pendulum rotates in a resonate state in a constant direction. However, as a practical matter, for a given set of wave conditions a resonant or even quasi-resonant state may not necessarily be achieved. As such, concepts described herein are implemented to maximize power output even when resonance cannot be achieved.

Figure 2:
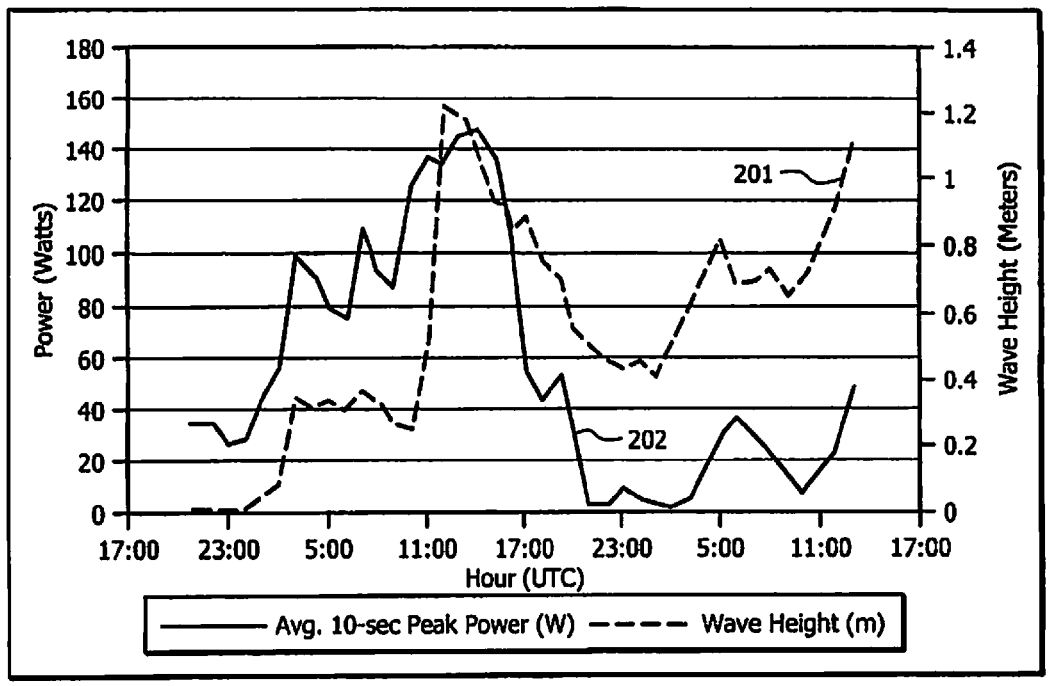
FIG. 2 is a chart illustrating generator output as a function of wave height over time according to a preferred embodiment.

With the foregoing in mind, FIG. 2 illustrates power output for such a generator as a function of wave height over time. As seen, power output correlates with wave height 201. Wave height 201 varies over time according to a number of environmental conditions, whether periodic or aperiodic. For a pendulum of fixed length subject to constant (or near constant) mechanical load, the rotational velocity of the working pendulum, and likewise its energy output 202, depends upon a combination of conditions. These conditions predominantly include wave periodicity, wave steepness, wave interaction with the pendulum's natural frequency, and the amount of drag placed upon the pendulum. The implementations described herein serve to maximize the generator power output 202 over varying environmental conditions, i.e., over various patterns of wave height 201 over time.

Accordingly, a computational model is implemented to 1) evaluate such a generator's power output under a particular set of observed conditions, and/or 2) estimate power output under expected future conditions or even purely hypothetical conditions. The computational model is implemented to maximize a pendulum's power output under the observed and/or expected conditions by finding optimal values for various parameters to maximize the work done by the rotating pendulum against wave motion.

The computational model used to maximize power output over time can be implemented in hardware, software, firmware, or a combination of each. The processing components necessary to execute the computational model may be separate or remote from the generator, or local to the generator itself. The computational model may determine optimal values according to observed conditions or expected conditions. As such, according to one embodiment, the computational model is executed (at least partially) before the generator is deployed. In this way, some initial parameters, such as pendulum mass, generator mass and counterweight ratio, mooring line length, and the like can be pre-determined as optimal under expected conditions such that the generator is deployed according to those settings. According to another embodiment, a generator contains a processing module, which has stand-alone on-board processing components sufficient to analyze measured environmental data and execute instructions to maximize pendulum power output in response to that analysis. According to such an embodiment, a generator may be capable of operating independently of other buoys and is responsible for maximizing its own power output. According to particular embodiments, processing module 10 may employ the computational model at the buoy itself to obtain a set of instructions for optimizing power output according to local conditions. However, processing module 10 may also retrieve instructions from a central location, where the computational model has been executed at the central location. In any event, the processing module 10 executes the instructions necessary to achieve optimized pendulum instructions. Doing so may further comprise varying initial parameters that were set before or during deployment of the generator.

As mentioned, buoys may operate in a grid containing a number of other buoys. As such, it may be advantageous for one buoy in the grid to be aware of the behavior of other buoys in the grid. Accordingly, processing module 10 may further contain on-board communication components, e.g., RF wireless communication module 92, to enable buoys to share information such as local power output data, local environmental conditions, etc. This information may be shared directly between buoys or may be transmitted to one or more central stations, where the central stations collect and distribute the information among the buoys. Sharing this information may be beneficial for predicting local environmental conditions at a given buoy and making necessary adjustments to maximize power in anticipation of those conditions.

Other embodiments are envisioned where each buoy contains minimal hardware, software, etc., such that the bulk of data processing is performed at one or more central stations. In these cases, the components of processing module 10 are typically shared between a buoy 70 and a central station. According to such embodiments, each buoy is equipped with components required to effectuate adjustments needed to maximize power output, but is not required to contain data processing components. Rather, central stations are employed to process the data and perform other functions, such as monitoring individual buoy performance, executing remote diagnostic assistance, performing trouble shooting, and the like. The central stations may be located within a grid or may located at a remote location. Also, these central stations may be configured to operate autonomously, or may provide a user interface where an operator interacts with the system and enables execution of the monitoring and diagnostic functions described above.

In view of the foregoing, each apparatus 10 may include measurement module 93, which may be responsible for measuring these conditions and communicating the same to processing module 90. To that end, measurement module 93 includes measurement instruments for measuring wind speed, buoy tilt with respect to horizon, time intervals, pitch, roll, translation, and the like. Measurement module 93 may stand alone from processing module 10 as an independent subsystem or may be configured as part of processing module 10 itself.

In any event, the relevant problem becomes one of maximizing power output, i.e., finding the resonant or near resonant state of the working pendulum, under present conditions or under predicted conditions. To that end, it has been found that the pendulum can be brought closer to a resonant or near resonant state by varying the restoring force applied to the pendulum against the prevailing wave motion. That is, power output is further maximized where the generator is forced to "work against" the waves. A central concept in maximizing power output from a generator operating under the influence of wave motion involves forcing the generator to actually "work against" the waves themselves. This is accomplished by accelerating the generator in a direction against wave movement, rather than letting the generator merely drift along the water surface. According to other implementations, varying the load on the pendulum arm and/or varying the distance between the pendulum's axis of rotation and its working mass can also be performed to bring the pendulum closer to a resonant or near resonant state. A system and method for doing so is described in U.S. Pat. No. 8,046,108, the disclosure of which is incorporated by reference in its entirety.

Figure 3:
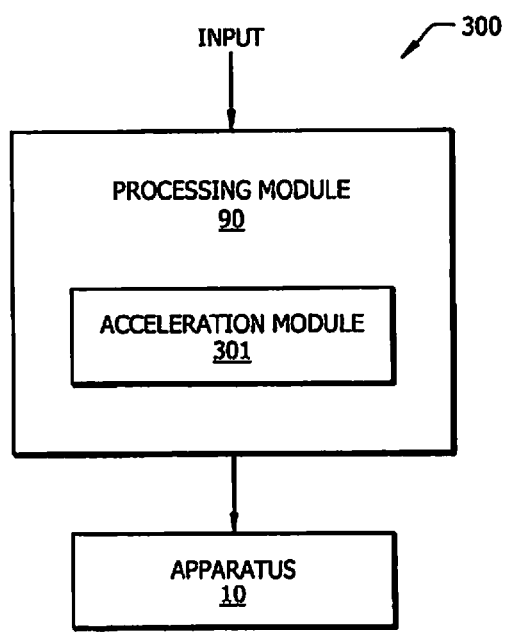
FIG. 3 is a block diagram of logic according to a preferred embodiment.

FIG. 3 illustrates exemplary logic that may be implemented to maximize power output from a generator operating under the influence of wave motion. Specifically, the illustrated logic operates to maximize the work performed by the generator against the waves according to the concepts described herein. As such, logic 300 comprises various logic that cooperate to achieve these objectives. It will be understood by those in the art that functions performed by each block in the logic may be collocated in a single block, or separated in different blocks or combinations of blocks, according to system parameters and the like. Further, all of the logic illustrated at FIG. 3 may be provided on a single semiconductor device or may be distributed among several separate devices. The logic illustrated at FIG. 3 may entirely reside in a single processing platform such as, e.g., processing module 90 described above, or be distributed among several platforms—both local and remote from apparatus 10.

Acceleration module 301 operates to determine an amount of force that should be applied to apparatus 10 against wave motion to maximize the movement of, or work performed by, pendulum 12, under a given set of conditions. For example, it may be determined that under calm wave conditions with little lateral force applied to apparatus 10 from the central point of its mooring line extending between apparatus 10 and counterweight, little force is required to accelerate apparatus 10 against the relatively week lateral forces. In this case, the lateral forces applied to apparatus 10 causing it to deviate from the central point are minor. As such, the force required to overcome those lateral forces are also minor. On the other hand, when forces are strong, e.g., strong lateral winds and/or turbulent wave motion result in strong deviations of apparatus 10 from the central point, module 301 operates to apply sufficiently strong force on apparent 10 to overcome those forces and restore it about the central point. In doing so, acceleration module 301 may initially set various parameter values according to expected conditions so that apparatus 10 is deployed according to those initial parameter values. Additionally, acceleration module 301 may tune or vary those parameter values according as measured conditions change from those that were expected.

In either event, acceleration module 301 operates to ensure that a restoring force is applied to apparatus 10 in such a way as to maximize the work performed by pendulum 12 according to environmental conditions. According to an implementation, acceleration module 301 may change the values of various parameters to achieve that objective.

For example, where a stronger force should be applied to restore apparatus 10 to a central point (characterized by the position where apparatus 10 and counterweight 22 are vertically, or substantially vertically, aligned) in opposition to lateral forces and/or wave motion applied to apparatus 10, the mass of counterweight 22 should be higher rather than lower. More specifically, the mass ratio between apparatus 10 and counterweight 22 may be determined according to a given set of conditions. According to a preferred embodiment the mass ratio between apparatus 10 and counterweight 22 is approximately 2 to 1. This ratio is suitable for a range of conditions where apparatus 10 is accelerated enough to work against the waves without being over-accelerated and simply "cut through" the waves. In other preferred embodiments the mass ratio between apparatus 10 and counterweight 22 is approximately 1.5 to 1, approximately 3 to 1, approximately 4 to 1, or approximately 5 to 1.

Consistent with the foregoing, the mass of counterweight 22 may be initially set so that apparatus 10 is deployed with a counterweight 22 of a particularly mass. Otherwise, the mass of counterweight 22 may be adjusted by, e.g., mechanical means. Where counterweight 22 contains a combination of air and water, the buoyancy and effective mass of counterweight 22 may be adjusted whereby an inlet and pump combination control the amount of water stored in counterweight 22. According to another embodiment, a mechanical device can be used to stack and remove additional weights on top of or along counterweight 22.

The elasticity of mooring line 26 extending between apparatus 10 and counterweight 22 may be adjusted according to desired acceleration. A more elastic mooring line will provide increased acceleration to restore apparatus 10 when it is stretched from its initial length. This additional restoring force can be leveraged with other parameters to further tune the amount of force applied to apparatus 10 restore same to its central point.

The shape of counterweight 22 may further influence the restoring force applied to apparatus 10. Where a stronger force is required the top portion of counterweight 22 may be shaped to increase resistance to upward movement of counterweight 22 thereby tending to hold apparatus 10 in place, and its bottom portion may be shaped to lower resistance to downward movement of counterweight 22.

To further optimize the control afforded to the overall system, the degrees of freedom for counterweight 22 may be reduced or expanded to further influence the behavior of apparatus 10 along the water surface. As previously discussed, according to one implementation, apparatus 10 deviates from a central point of vertical alignment with counterweight 22 as it moves up and down within a centrally fixed ring. The degree of vertical movement allowed to counterweight 22 may be increased to afford apparatus 10 a broader range of motion along the water surface. In this way, apparatus 10 may be allowed to move with lateral wave motion for a greater duration. On the other hand, where lateral motion should be restricted, the vertical range of motion of counterweight 22 may be reduced accordingly. These changes may be implemented by, e.g., a number of mechanical means. For example, the length of mooring line 26 may be lengthened by a means for coiling and uncoiling same to provide a great degree of freedom, such as that provided by coiler 28. Also, a horizontal degree of freedom may be adjusted for counterweight 22. According to one implementation the circumference of the ring that confines counterweight 22 may be expanded or contracted, according to respectively increase or decrease the degree of freedom of apparatus 10 along the surface of the water, such as that provided by ring adjuster 30.

Accordingly, the change in circumference may be accomplished by mechanical means, where e.g., a device attached along the ring winds or unwinds the ring along its length to effect a circumferential change.

An additional benefit of adjusting the length of the mooring line allows the system to change the angle of the mooring line with respect to the surface of the water. As can be readily seen, a longer mooring line allows for a more acute angle between the water surface and the mooring line. In such a case, the restoring force applied to apparatus is applied more in the horizontal direction than in the vertical direction. The vector of the applied restoring force influences how apparatus 10 interacts with the surface of the water. According to a preferred embodiment, the computational model computes an ideal vector, characterized in terms of vertical and horizontal contributions, for the applied restoring force and may provide instructions to effect a length adjustment of mooring line 26 achieve a mooring line length that provides the desired vector.

Figure 4:
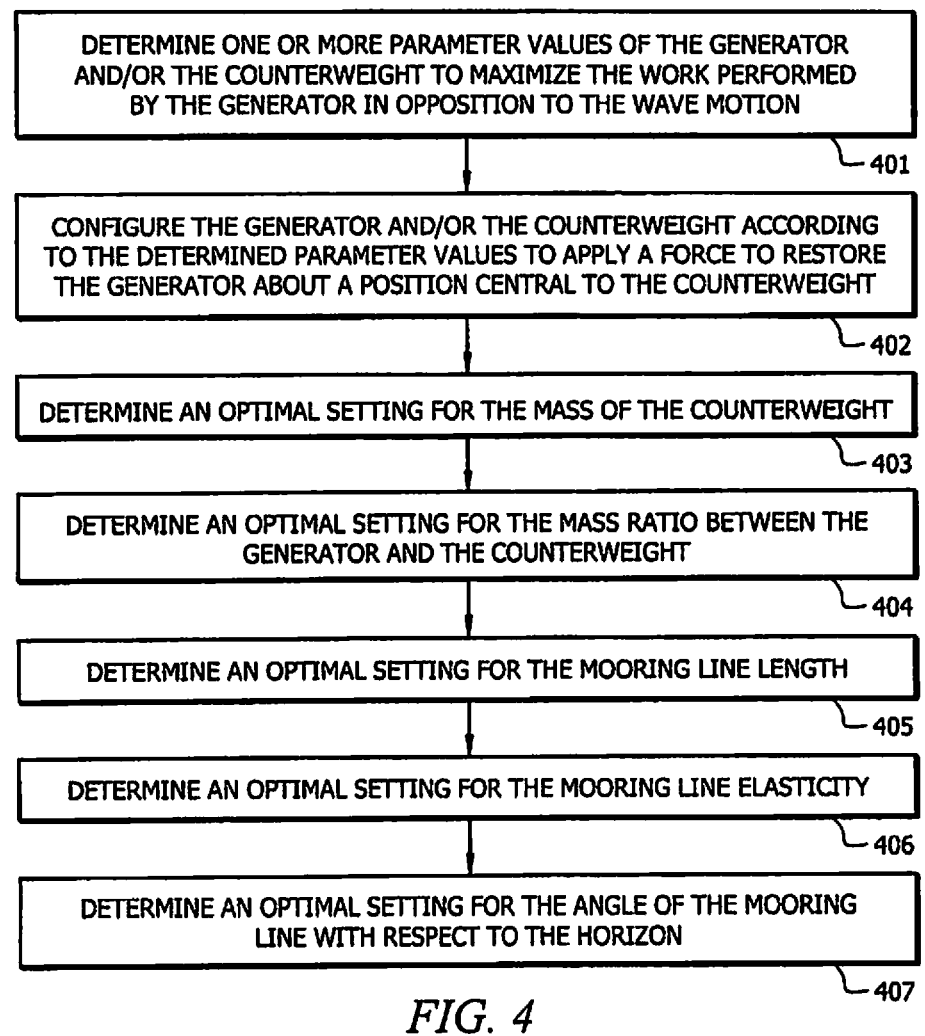
FIG. 4 is a flow chart according to a preferred embodiment.

FIG. 4 contains a flow chart 300 of a method for maximizing the output of a generator operating under the influence of wave motion according to the concepts described herein. The method illustrated in FIG. 3 may be performed by a system such as that illustrated in FIG. 1. At step 401 one or more parameter values are determined according to the computational model described herein for the generator and/or the counterweight to influence the behavior of the generator and the counterweight. Specifically, according to the determined settings, work performed by the generator in opposition to the wave motion is maximized. At step 402 the generator and/or the counterweight are configured according to the determined parameter values to apply a force to restore the generator about a position central to said counterweight. At step 403 an optimal setting is determined for the mass of the mooring. At step 404 an optimal setting is determined for the mass ratio between said generator and said mooring. At step 405 an optimal setting is determined for the mooring line length. At step 406 an optimal setting is determined for the mooring line elasticity. At step 407 an optimal setting is determined for the angle of said mooring line with respect to the horizon. Consistent with the foregoing description, each of steps 401-407 may be performed before the generator is deployed or during generator deployment, or after the generator has been deployed in response to measured environmental conditions.

Figure 5:
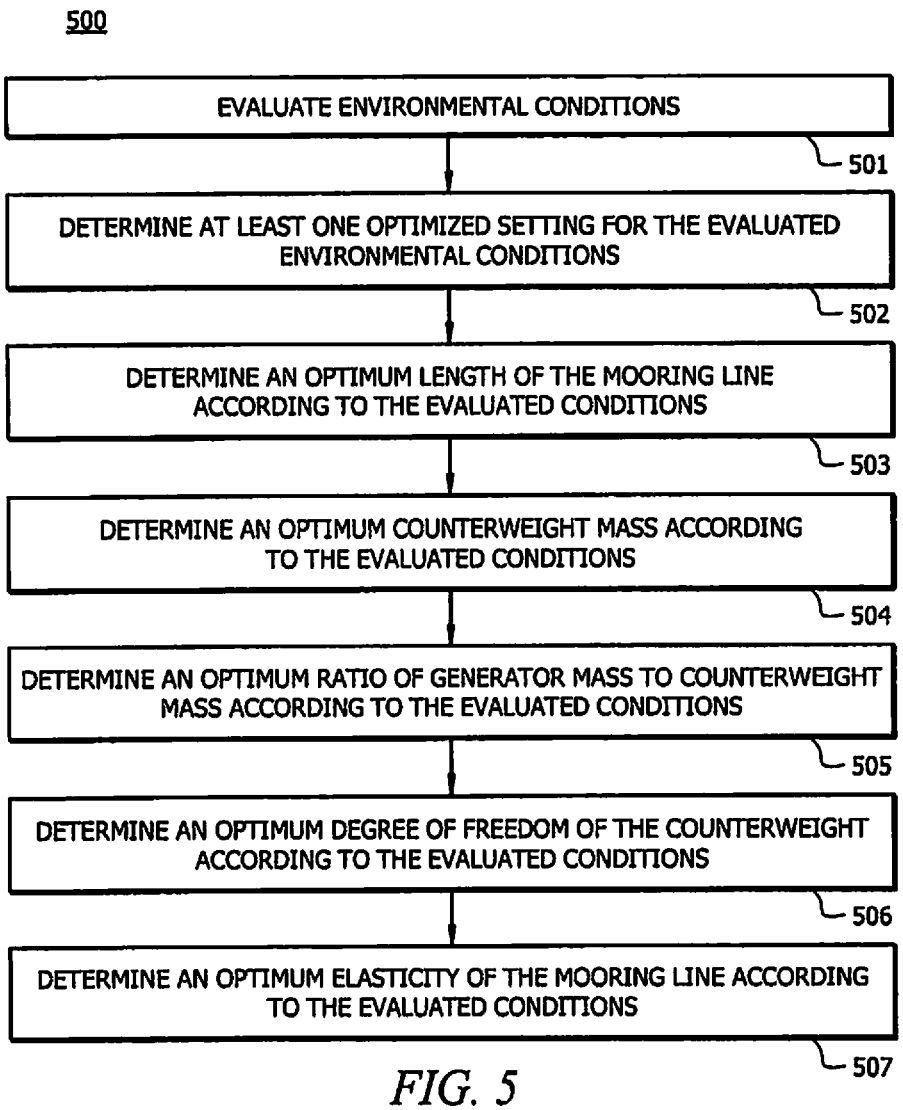
FIG. 5 is another flow chart according to a preferred embodiment.

FIG. 5 contains another flow chart 500 of a method for maximizing the output of a generator operating under the influence of wave motion according to the concepts described herein. The method illustrated in FIG. 5 may be performed by a system such as that illustrated in FIG. 1. At step 501 environmental conditions are evaluated. The conditions may be expected or they may be measured. At step 502 at least one optimized setting for the measured conditions is determined. At step 503 an optimum length of a mooring line extending between a mooring and the generator is determined according to the evaluated conditions. At step 504 an optimum counterweight is determined according to the evaluated conditions. At step 505 an optimum ratio of generator mass to counterweight is determined according to the evaluated conditions. At step 506 an optimum degree of freedom of the mooring is determined according to the evaluated conditions. At step 507 an optimum elasticity of the mooring line is determined according to the evaluated conditions.

It has been found that more often than not a change in wave conditions sufficient to justify a change in the load exerted upon pendulum 12 occurs relatively slowly, e.g., on the order of a few to several minutes. According to present observations, such a change is typically brought about by a series of incremental changes occurring over a period of minutes. As such, once an appropriate load is determined under a particular set of conditions, the load can be incrementally stepped up or down in response to changing conditions. Because the system does not require fast-acting load variation, its computational requirements and associated energy consumption is relatively low. Although not typically required, the embodiments described herein are also capable of varying the load exerted upon pendulum 12 very quickly, i.e., on the order of seconds, depending upon the rate of change in wave conditions.

A buoy's ability to independently tune its pendulum is important because, as a practical matter, a buoy will be one buoy within a grid of buoys. Current observations reveal that as a front of waves passes through such a grid, the waves are altered (e.g., in terms of shape, direction, period, etc.) as they interact with each buoy. As a result, wave conditions at one point in the grid will not be the same as wave conditions on at another point in the grid. Therefore, it is desirable that each buoy be capable of some degree of autonomous tuning to best adjust to local wave conditions. According to a preferred embodiment, the computer model discussed herein comprises computer simulations that reveal a power "fingerprint" of a buoy having a certain configuration under a given set of conditions. While real conditions may present a more complex system, nevertheless, these simulations yield fingerprints very similar to those found in the real-world conditions.

The invention described herein is made more robust by the implementation of system-wide "learning." According to a preferred embodiment, a network system is provided where buoys within that system interact with one another, perhaps through a central station. The central station collects information related to sea conditions based, at least in part, upon a buoy's power output fingerprint at a given configuration. The system "learns" these fingerprints as being associated with a set of environmental conditions and begins library of those conditions. Further, the system then adjust the configuration (i.e., pendulum load and effective length) of a pendulum until it finds the optimum fingerprint for that set of conditions. After a "best setting" it can be disseminated throughout the system, either being stored centrally or locally at each buoy.

By way of example, suppose buoy 70 determines wave behavior through its on-board inertial sensors. Buoy 70, using processing module 10, may first consult on-board memory within system 91 to look for ideal configuration settings to maximize its power output. If the on-board memory does not contain the measured conditions (or an optimized setting), then buoy 70 may transmit the measured conditions to a central station using communication module 92. If the central station finds ideal configuration settings for the given conditions, it communicates the same to buoy 70, which then implements those settings. If the central station does not find a match, it would inform buoy 70 that no match is found and perhaps offer the closest configuration available. In any event, the conditions are recorded and stored in a library for future consultations. According to this system, the library will grow at an inverse exponential rate (i.e., where library growth decreases over time). In any event, the collective buoy network becomes increasingly efficient at maximizing its power as the information data base make it possible for each individual buoy to rapidly achieve and maintain optimal tuning.

The invention claimed is:

1. A method for optimizing power output of a generator operating under the influence of wave motion, said method comprising:

evaluating a first set of environmental conditions under which the generator operates;

determining one or more parameter values for at least one of said generator at a first end of a mooring line and a counterweight coupled to said generator at a second send of the mooring line to maximize the work performed by said generator in opposition to said wave motion under the first set of environmental conditions, where said one or more parameter values comprises a first counterweight mass;

configuring at least one of said generator and said counterweight according to said determined one or more parameter values, where configuring at least one of said generator and said counterweight comprises configuring the counterweight to have the first counterweight mass; and applying, by the counterweight having the first counterweight mass, a force to restore said generator about a position central to said counterweight using the determined one or more parameter values.

2. The method of claim 1 further where evaluating the first set of environmental conditions comprises:

evaluating at least one of environmental conditions under which the generator is operating and environmental conditions under which the generator is expected to operate.

3. The method of claim 1 wherein said one or more parameter values further comprises:

a second mass of said counterweight.

4. The method of claim 1 wherein said one or more parameters further comprises:

mass ratio between said generator and said counterweight.

5. The method of claim 1 wherein said one or more parameter values further comprises:

mooring line length.

6. The method of claim 1 wherein said one or more parameter values further comprises:

mooring line elasticity.

7. The method of claim 1 wherein said one or more parameter values further comprises:

the angle of said mooring line with respect to the horizon.

8. An apparatus that generates electricity under the influence of wave motion, said apparatus comprising:

a counterweight at a first end of a mooring line;

a generator at second end of the mooring line, where the generator comprises a pendulum rotating under the influence of said wave motion; and one or more processors connected to the generator, where the one or more processors configures at least one of said generator and said counterweight according to one or more settings determined to influence the behavior of said generator and said counterweight to maximize the work performed by said generator in opposition to said wave motion.

9. The generator of claim 8 wherein said one or more settings comprises:

mass of said counterweight.

10. The generator of claim 8 wherein said one or more settings comprises:

mass ratio between said generator and said counterweight.

11. The generator of claim 8 wherein said one or more settings comprises:

mooring line length.

12. The generator of claim 8 wherein said one or more settings comprises:

mooring line elasticity.

13. The generator of claim 8 wherein said one or more settings comprises:

the angle of said mooring line with respect to the horizon.

14. A method for optimizing power output of a generator operating under the influence of wave motion, said method comprising:

evaluating environmental conditions;

determining at least one optimized setting for at least one of said generator and a counterweight coupled to said generator under said evaluated conditions; and setting at least one parameter according to said at least one optimized setting; and applying a restoring force to said generator against said wave motion to optimize the power output of said generator.

15. The method of claim 14 further comprising:

optimizing the length of a mooring line extending between a mooring and said generator.

16. The method of claim 14 further comprising:

optimizing the angle between a mooring line extending between a mooring and said generator.

17. The method of claim 14 further comprising:

optimizing counterweight mass according to said determined optimized generator setting.

18. The method of claim 14 further comprising:

optimizing the ratio of generator mass to counterweight mass.

19. The method of claim 1 further comprising:

optimizing a degree of freedom of said mooring according to said determined optimized generator setting.

20. The method of claim 14 further comprising:

optimizing the elasticity of said mooring line according to said determined optimized generator setting.

21. A generator operating under the influence of wave motion, said generator comprising:

a pendulum rotating under the influence of said wave motion; and a processor configured to:

evaluate environmental conditions, determine at least one optimized setting for at least one of said generator and a counterweight coupled to said generator under said evaluated conditions; and set at least one parameter according to said at least one optimized setting to apply a restoring force to said generator against said wave motion to optimize the power output of said generator.

22. The generator of claim 21 wherein said processor is further configured to:

optimize the length of a mooring line extending between a mooring and said generator.

23. The generator of claim 21 wherein said processor is further configured to:

optimize the angle between a mooring line extending between a mooring and said generator.

24. The generator of claim 21 wherein said processor is further configured to:

optimize counterweight mass according to said determined optimized generator setting.

25. The generator of claim 21 wherein said processor is further configured to:

optimize the ratio of generator mass to counterweight mass.

26. The generator of claim 21 wherein said processor is further configured to:

optimize a degree of freedom of said mooring according to said determined optimized generator setting.

27. The generator of claim 21 wherein said processor is further configured to:

optimize the elasticity of said mooring line according to said determined optimized generator setting.

28. A method for optimizing power output of a generator operating under the influence of wave motion, the method comprising:
- measuring a first set of environmental conditions, the first set of environmental conditions comprising a first wave speed;
- retrieving, from a memory, a first set of counterweight parameter values corresponding to the first set of environmental conditions, the first set of parameter values comprising a first counterweight mass;
- based on the retrieved first set of counterweight parameter values, configuring a counterweight at a first end of a mooring line to have the first counterweight mass, the first counterweight mass sufficient to apply a force to restore a generator at a second end of the mooring line about a position central to the counterweight in opposition to waves traveling at the first wave speed;
- measuring a second set of environmental conditions, the second set of environmental conditions comprising a second wave speed;
- retrieving, from the memory, a second set of counterweight parameter values corresponding to the second set of environmental conditions, the second set of parameter values comprising a second counterweight mass; and
- based on the retrieved second set of counterweight parameter values, configuring the counterweight at the first end of a mooring line to have the second counterweight mass, the second counterweight mass sufficient to apply a force to restore the generator at the second end of the mooring line about the position central to the counterweight in opposition to waves traveling at the second wave speed.

29. The method of claim 28 where the generator comprises a pendulum that rotates under the influence of wave motion, where the pendulum rotates in response to the generator tilting with respect to the horizon.

30. An apparatus for optimizing power output of a generator operating under the influence of wave motion, the apparatus comprising:
- a counterweight at a first end of a mooring line;
- a housing at a second end of the mooring line, the housing comprising:
  - a pendulum that rotates in response to the generator tilting with respect to the horizon; and
  - one or more processors connected to the generator, the one or more processors comprising:
    - a measurement module that measures a first set of environmental conditions, the first set of environmental conditions comprising a first wave speed;
    - a communication module that retrieves, from a memory, a first set of counterweight parameter values corresponding to the first set of environmental conditions, the first set of counterweight parameter values comprising a first counterweight mass; and
    - an acceleration module that configures, based on the retrieved first set of counterweight parameter values, the counterweight at the first end of a mooring line to have the first counterweight mass, the first counterweight mass sufficient to apply a force to restore the housing at the second end of the mooring line about a position central to the counterweight in opposition to waves traveling at the first wave speed.

31. The apparatus of claim 30 where:
- the measurement module measures a second set of environmental conditions, the second set of environmental conditions comprising a second wave speed;
- the communication module retrieves, from the database, a second set of counterweight parameter values corresponding to the second set of environmental conditions, the second set of counterweight parameter values comprising a second counterweight mass; and
- the acceleration module configures, based on the retrieved second set of counterweight parameter values, the counterweight at the first end of a mooring line to have the second counterweight mass, the second counterweight mass sufficient to apply a force to restore the housing at the second end of the mooring line about the position central to the counterweight in opposition to waves traveling at the second wave speed.

32. A method for optimizing power output of a generator operating under the influence of wave motion, the method comprising:
- evaluating a first set of environmental conditions and a second set of environmental conditions under which the generator operates;
- determining one or more parameter values for at least one of the generator at a first end of a mooring line and a counterweight coupled to the generator at a second send of the mooring line to maximize the work performed by the generator in opposition to the wave motion under the first set of environmental conditions and the second set of environmental conditions, where the one or more parameter values comprises a first counterweight mass;
- configuring at least one of the generator and the counterweight according to the determined one or more parameter values, where configuring at least one of the generator and the counterweight comprises: configuring the counterweight to have the first counterweight mass, configuring a mass ratio between the generator and the counterweight, and configuring mooring line length; and
- applying, by the counterweight having the first counterweight mass, a force to restore the generator about a position central to the counterweight using the determined one or more parameter values.

\* \* \* \* \*